United States Patent
Okabe et al.

(10) Patent No.: US 11,431,474 B2
(45) Date of Patent: Aug. 30, 2022

(54) VERIFICATION TERMINAL AND VERIFICATION SYSTEM

(71) Applicant: DENSO CORPORATION, Kariya (JP)

(72) Inventors: Tatsuya Okabe, Kariya (JP); Eiichi Okuno, Kariya (JP); Takao Nojiri, Kariya (JP)

(73) Assignee: DENSO CORPORATION, Kariya (JP)

( * ) Notice: Subject to any disclaimer, the term of this patent is extended or adjusted under 35 U.S.C. 154(b) by 590 days.

(21) Appl. No.: 16/288,484

(22) Filed: Feb. 28, 2019

(65) Prior Publication Data

US 2019/0273606 A1 Sep. 5, 2019

(30) Foreign Application Priority Data

Mar. 1, 2018 (JP) .............................. JP2018-036447

(51) Int. Cl.
  *H04L 9/06* (2006.01)
  *H04L 9/32* (2006.01)

(52) U.S. Cl.
  CPC .......... *H04L 9/0643* (2013.01); *H04L 9/3239* (2013.01)

(58) Field of Classification Search
  CPC .......................... H04L 9/0643; H04L 9/3239
  See application file for complete search history.

(56) References Cited

U.S. PATENT DOCUMENTS

| | | |
|---|---|---|
| 2012/0173867 A1 | 7/2012 | Hirabayashi |
| 2012/0201380 A1 | 8/2012 | Kohiyama |
| 2014/0114497 A1 | 4/2014 | Miyake |
| 2015/0191135 A1 | 7/2015 | Ben Noon et al. |
| 2015/0191136 A1 | 7/2015 | Ben Noon et al. |

(Continued)

FOREIGN PATENT DOCUMENTS

| | | | |
|---|---|---|---|
| CN | 108270573 | * | 1/2018 |
| JP | 2002244555 A | | 8/2002 |

(Continued)

OTHER PUBLICATIONS

Sousa, Joao et al. "A Byzantine Fault-Tolderant Ordering Service for the Hyperledger Fabric Blockchain Platform" [online] Cornell University, Sep. 20, 2017 [rectrieved Jun. 2, 2021].Retrieved from the Internet: URL: https://arxiv.org/pdf/1709.06921.pdf (Year: 2017).*

*Primary Examiner* — Taghi T Arani
*Assistant Examiner* — Joshua Raymond White
(74) *Attorney, Agent, or Firm* — Maschoff Brennan

(57) ABSTRACT

A verification terminal includes a storage unit that stores partial block data. The partial block data is the latest data that a part of block data for update and addition in chronological order. The verification terminal selects a plurality of approval terminals to approve the partial block data stored in the storage unit. When a transaction included in the partial block data stored in the storage unit is updated by the verification terminal, the verification terminal transmits an approval request that requests the selected approval terminals to approve the updated partial block data to which the updated transaction and a hash value of the partial block data before updating are added. The verification terminal executes an update process of the partial block data based on approval results returned from the approval terminals in response to the approval request transmitted by the approval requesting unit.

10 Claims, 13 Drawing Sheets

(56) References Cited

U.S. PATENT DOCUMENTS

| | | |
|---|---|---|
| 2015/0191151 A1 | 7/2015 | Ben Noon et al. |
| 2015/0195297 A1 | 7/2015 | Ben Noon et al. |
| 2017/0250815 A1* | 8/2017 | Cuende ............... G06F 16/9014 |
| 2017/0259761 A1 | 9/2017 | Ben Noon et al. |
| 2017/0341604 A1 | 11/2017 | Ben Noon et al. |
| 2017/0341605 A1 | 11/2017 | Ben Noon et al. |
| 2017/0355326 A1 | 12/2017 | Ben Noon et al. |
| 2018/0015888 A1 | 1/2018 | Ben Noon et al. |
| 2018/0029539 A1 | 2/2018 | Ben Noon et al. |
| 2018/0029540 A1 | 2/2018 | Ben Noon et al. |
| 2018/0063238 A1* | 3/2018 | Zhang ................. G06F 11/1425 |
| 2018/0167360 A1 | 6/2018 | Maeda et al. |
| 2018/0219832 A1 | 8/2018 | Maeda et al. |
| 2018/0241551 A1 | 8/2018 | Fujimura et al. |
| 2018/0294991 A1 | 10/2018 | Tsurumi et al. |
| 2018/0323964 A1 | 11/2018 | Watanabe et al. |
| 2019/0058590 A1 | 2/2019 | Watanabe et al. |
| 2019/0111863 A1 | 4/2019 | Ben Noon et al. |
| 2019/0180266 A1* | 6/2019 | Sidhu ..................... G06Q 20/20 |

FOREIGN PATENT DOCUMENTS

| | | |
|---|---|---|
| JP | 2004137897 A | 5/2004 |
| JP | 2011133967 A | 7/2011 |
| JP | 2012159979 A | 8/2012 |
| JP | 2012212452 A | 11/2012 |
| JP | 2013037474 A | 2/2013 |
| JP | 2013037574 A | 2/2013 |
| JP | 2013107454 A | 6/2013 |
| JP | 2013168007 A | 8/2013 |
| JP | 2013196330 A | 9/2013 |
| JP | 2015136107 A | 7/2015 |
| JP | 2017050719 A | 3/2017 |
| JP | 2017098806 A | 6/2017 |
| JP | 2017123692 A | 7/2017 |

* cited by examiner

FIG.3

| MANAGEMENT SERVER | OBJECT AREA | OBJECT TERMINAL |
|---|---|---|
| FOG001 | FOG-001 | |
| | FOG-002 | |
| | FOG-004 | T002,T003,T007,T008 |
| | FOG-005 | T001,T004,T005,T006,T009,T010,T013 |
| FOG002 | FOG-001 | |
| | FOG-002 | |
| | FOG-003 | T011 |
| | FOG-004 | T002,T003,T007,T008 |
| | FOG-005 | T001,T004,T005,T006,T009,T010,T013 |
| | FOG-006 | T012 |
| FOG003 | FOG-002 | |
| | FOG-003 | T011 |
| | FOG-005 | T001,T004,T005,T006,T009,T010,T013 |
| | FOG-006 | T012 |
| FOG004 | FOG-001 | |
| | FOG-002 | |
| | FOG-004 | T002,T003,T007,T008 |
| | FOG-005 | T001,T004,T005,T006,T009,T010,T013 |
| | FOG-007 | |
| | FOG-008 | |
| FOG005 | FOG-001 | |
| | FOG-002 | |
| | FOG-003 | T011 |
| | FOG-004 | T002,T003,T007,T008 |
| | FOG-005 | T001,T004,T005,T006,T009,T010,T013 |
| | FOG-006 | T012 |
| | FOG-007 | |
| | FOG-008 | |
| | FOG-009 | |
| FOG006 | FOG-002 | |
| | FOG-003 | T011 |
| | FOG-005 | T001,T004,T005,T006,T009,T010,T013 |
| | FOG-006 | T012 |
| | FOG-008 | |
| | FOG-009 | |
| FOG007 | FOG-004 | |
| | FOG-005 | T001,T004,T005,T006,T009,T010,T013 |
| | FOG-007 | |
| | FOG-008 | |
| FOG008 | FOG-004 | T002,T003,T007,T008 |
| | FOG-005 | T001,T004,T005,T006,T009,T010,T013 |
| | FOG-006 | T012 |
| | FOG-007 | |
| | FOG-008 | |
| FOG009 | FOG-005 | T001,T004,T005,T006,T009,T010,T013 |
| | FOG-006 | T012 |
| | FOG-008 | |
| | FOG-009 | |

FIG.4

| MANAGEMENT SERVER | OBJECT AREA | OBJECT TERMINAL |
|---|---|---|
| FOG001 | FOG-001 | |
| | FOG-002 | |
| | FOG-004 | T002,T003,T007,T008 |
| | FOG-005 | T001,T004,T005,T006,T009,T013 |
| FOG002 | FOG-001 | |
| | FOG-002 | |
| | FOG-003 | T011 |
| | FOG-004 | T002,T003,T007,T008 |
| | FOG-005 | T001,T004,T005,T006,T009,T013 |
| | FOG-006 | T012,T010 |
| FOG003 | FOG-002 | |
| | FOG-003 | T011 |
| | FOG-005 | T001,T004,T005,T006,T009,T013 |
| | FOG-006 | T012,T010 |
| FOG004 | FOG-001 | |
| | FOG-002 | |
| | FOG-004 | T002,T003,T007,T008 |
| | FOG-005 | T001,T004,T005,T006,T009,T013 |
| | FOG-007 | |
| | FOG-008 | |
| FOG005 | FOG-001 | |
| | FOG-002 | |
| | FOG-003 | T011 |
| | FOG-004 | T002,T003,T007,T008 |
| | FOG-005 | T001,T004,T005,T006,T009,T013 |
| | FOG-006 | T012,T010 |
| | FOG-007 | |
| | FOG-008 | |
| | FOG-009 | |
| FOG006 | FOG-002 | |
| | FOG-003 | T011 |
| | FOG-005 | T001,T004,T005,T006,T009,T013 |
| | FOG-006 | T012,T010 |
| | FOG-008 | |
| | FOG-009 | |
| FOG007 | FOG-004 | |
| | FOG-005 | T001,T004,T005,T006,T009,T013 |
| | FOG-007 | |
| | FOG-008 | |
| FOG008 | FOG-004 | T002,T003,T007,T008 |
| | FOG-005 | T001,T004,T005,T006,T009,T013 |
| | FOG-006 | T012,T010 |
| | FOG-007 | |
| | FOG-008 | |
| FOG009 | FOG-005 | T001,T004,T005,T006,T009,T013 |
| | FOG-006 | T012,T010 |
| | FOG-008 | |
| | FOG-009 | |

FIG.5

| TERMINAL | VEHICLE HISTORY INFORMATION ||| PAYMENT HISTORY INFORMATION || DRIVER INFORMATION || MAP INFORMATION | DEVELOPMENT HISTORY INFORMATION | APPROVAL HISTORY INFORMATION ||
|---|---|---|---|---|---|---|---|---|---|---|---|
| | ACCIDENT HISTORY | FAILURE HISTORY | CHARGE AND DISCHARGE HISTORY | EXPRESSWAY TOLL | PURCHASE OF ARTICLES | SHARED CAR | INSURANCE | | | TIMESTAMP | HASH VALUE |
| T001 | 2017/1/8 | — | 300 TIMES / YEAR | — | — | — | Y | NORMAL | — | 2018/2/5 10:00 | 0x000x00 |
| T002 | — | 2010/3/6 | — | — | — | — | Y | NORMAL | — | 2018/2/5 10:02 | 0x0x0x00 |
| T003 | — | — | — | — | — | — | — | UNCONFIRMED | — | 2018/2/5 10:03 | 0x000x0x |
| T004 | — | — | — | — | — | — | — | — | — | 2018/2/5 10:01 | xx000x00 |
| T005 | — | — | — | — | — | — | — | — | — | 2018/2/5 09:59 | 0x000000 |
| T006 | — | — | — | — | — | — | — | — | — | 2018/2/5 10:00 | 0x0x0x00 |
| T007 | — | — | — | — | — | — | — | — | — | 2018/2/5 10:03 | 0x000x00 |
| T008 | — | — | — | — | — | — | — | — | — | 2018/2/5 10:00 | 0x000xxx |
| T009 | — | — | — | — | — | — | — | — | — | 2018/2/5 10:00 | 0x00xxx0 |
| T010 | — | — | — | — | — | — | — | — | — | 2018/2/5 09:59 | 0xx00x00 |
| T011 | — | — | — | — | — | — | — | — | — | 2018/2/5 10:00 | 0xxxxx00 |
| T012 | — | — | — | — | — | — | — | — | — | 2018/2/5 10:02 | xx000xx0 |

VERIFICATION TERMINAL AND VERIFICATION SYSTEM

CROSS-REFERENCE TO RELATED APPLICATION

This application is based on and claims the benefit of priority from earlier Japanese Patent Application No. 2018-036447 filed Mar. 1, 2018, the description of which is incorporated herein by reference.

BACKGROUND

Technical Field

The present disclosure relates to a verification terminal that validates block data for update and addition in chronological order and a verification system that validates block data for update and addition in chronological order.

Related Art

To protect data stored in a server or to protect data when data is transmitted and received between a data holder and another good-faith person, the data is encrypted. However, encryption of data is not an effective means for preventing a data administrator or a data holder from falsifying data. A technique utilizing a blockchain technique has been proposed to prevent a data administrator or a data holder from falsifying data.

SUMMARY

The present disclosure provides a verification terminal that validates block data for update and addition in chronological order. The verification terminal includes a storage unit that stores partial block data. The partial block data is the latest data that is a part of block data for update and addition in chronological order. The verification terminal selects a plurality of approval terminals that approve the partial block data stored in the storage unit.

When a transaction included in the partial block data stored in the storage unit is updated, the verification terminal requests the selected approval terminals to approve the updated partial block data to which the updated transaction and a hash value of the partial block data before updating are added, and executes an update process of the partial block data based on approval results returned from the selected approval terminals in response to an approval request from the verification terminal.

BRIEF DESCRIPTION OF THE DRAWINGS

In the accompanying drawings:

FIG. 3 is a diagram of information stored in each management server before the autonomous vehicle moves from one area to another area, according to the embodiment;

FIG. 4 is a diagram of information stored in each management server after the autonomous vehicle moves from one area to another area, according to the embodiment;

FIG. 5 is a diagram of master data that corresponds to full-size block data for update and addition in chronological order, according to the embodiment:

DESCRIPTION OF THE EMBODIMENTS

Figure 1:
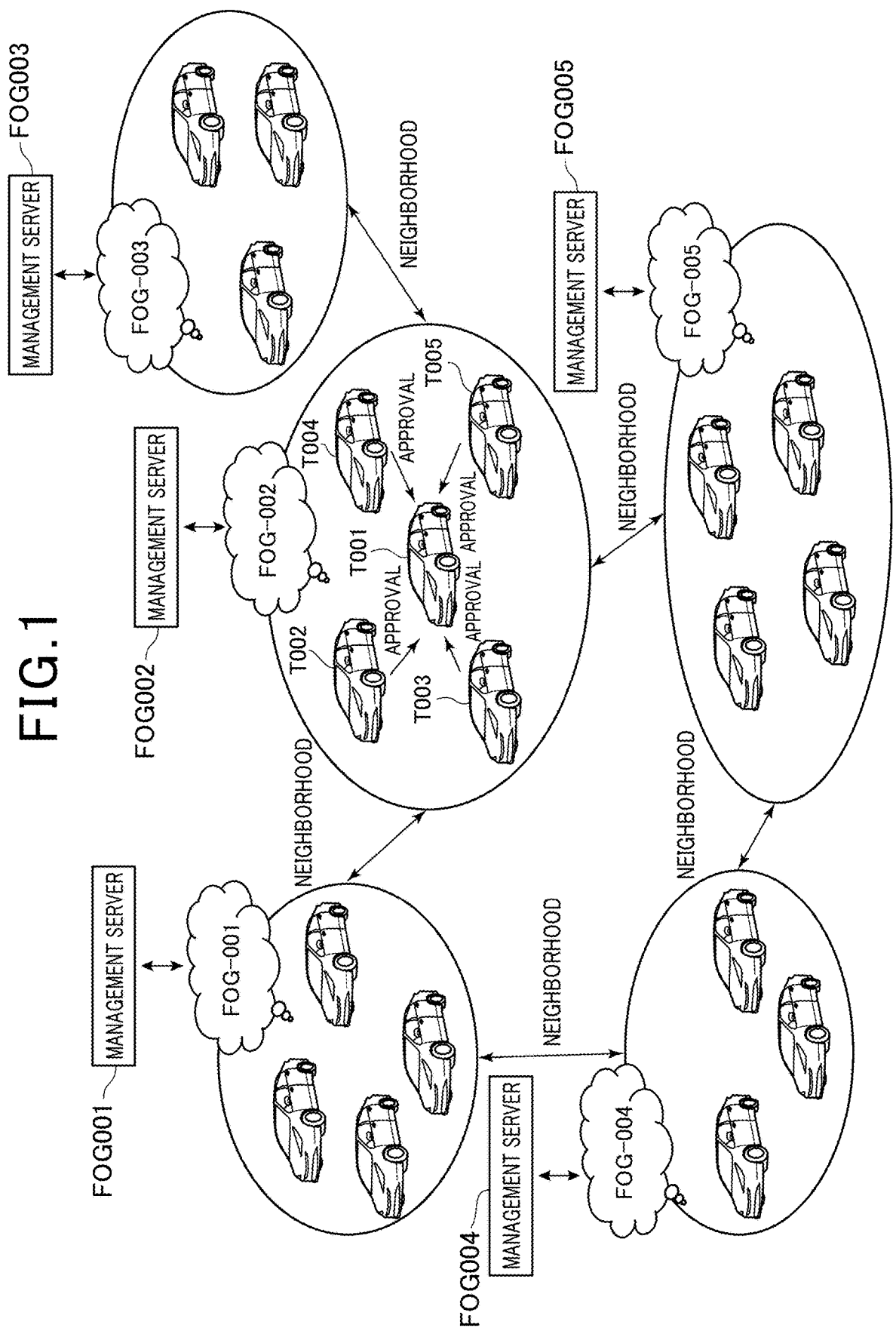
FIG. 1 is a diagram illustrating a basic concept of a verification terminal and a verification system for a plurality of autonomous vehicles that move in a plurality of areas to which a plurality of management servers are respectively allocated, according to an embodiment.

In embodiments of the present disclosure, the following matters are considered.

The technique for preventing falsification of data using the blockchain technique involves, as prerequisites, prevention of data falsification through sharing large amount of data among all users of the blockchain, guarantee, by a miner, of authenticity of the blockchain utilizing an enormous amount of computer resources, and reception of a reward for the guarantee.

When connected cars are prevalent that are motor vehicles equipped with a communication terminal to communicate, directly or via a network, with another motor vehicle, an infrastructure device, or a server, security of an enormous number of terminals needs to be ensured. An aspect of achievement of security involves prevention of falsification of in-vehicle data. The in-vehicle data includes vehicle history data and sensor information. A malicious user is expected to try to, for example, falsify vehicle history data to resell a motor vehicle at a price higher than an original value or to falsify sensor information to confuse other people. There is expected to be a growing need for prevention of falsification of in-vehicle data.

However, an attempt to apply known blockchain techniques directly to the prevention lead to a failure to deal with an enormous amount of calculation load due to limitations on an in-vehicle memory and an in-vehicle central processing unit (CPU). Furthermore, including provision of a reward as a prerequisite causes barriers to construction of a business model; the barriers include securing of a funding source.

It is thus desired to provide a data falsification prevention technique that can be implemented by allowing randomness to be achieved from a viewpoint specific to motor vehicles and having calculation load that can be dealt with even using limited resources specific to motor vehicles, instead of using all of the known blockchain techniques.

An exemplary embodiment of the present disclosure provides a verification terminal validating block data for update and addition in chronological order. The verification terminal includes a storage unit, an approval terminal selecting unit, an approval requesting unit, and an approval result registering unit. The storage unit stores partial block data.

The partial block data is the latest data that is a part of block data for update and addition in chronological order. The approval terminal selecting unit selects a plurality of approval terminals that are requested to approve the partial block data stored in the storage unit.

When a transaction included in the partial block data stored in the storage unit is updated by the verification terminal, the approval requesting unit transmits an approval request that requests the selected approval terminals to approve the updated partial block data to which the updated transaction and a hash value of the partial block data before updating are added. The approval result registering unit executes an update process of the partial block data based on approval results returned from the approval terminals in response to the approval request from the approval requesting unit.

In the exemplary embodiment, the partial block data stored in the storage unit time is the latest data that is a part of block data for update and addition in chronological order. This reduces the amount of data stored compared to storage of full-size block data (that has a full length) in chronological order, thus reducing calculation load in the verification terminal. The randomly selected approval terminals approve the partial block data. This makes it possible to predict the approval terminals in advance, thereby being able to prevent the stored partial block data from being falsified.

The present disclosure provides a verification system that validates block data for update and addition in chronological order. The verification system includes at least one management server and a plurality of verification terminals. In the verification system, the at least one management server stores full-size block data (that has a full length) for update and addition in chronological order in association with the verification terminals that store partial block data. The partial block data is the latest data that is a part of the full-size block data. The at least one management server receives end data of the partial block data transmitted from the verification terminals and collates the received end data with the stored full-size block data to verify authenticity of the end data.

The partial block data stored in the storage unit of the verification terminal has a partial length (i.e., partial data) and is the latest data that is a part of block data for update and addition in chronological order. The partial block data thus has lower resistance to falsification than the full-size block data. Thus, the verification terminal inquires of the management server for authenticity of the end data to allow authenticity of the partial block data to be secured.

The exemplary embodiment of the present disclosure may provide a data falsification prevention technique that can be implemented by allowing randomness to be achieved from a viewpoint specific to motor vehicles and using calculation load that can be dealt with even using limited resources specific to motor vehicles.

The present embodiment will be described below with reference to the attached drawings. For facilitation of understanding of the description, identical components in the drawings are denoted by identical reference numerals whenever possible, and duplicate descriptions are omitted.

A basic concept of the present embodiment will be described with reference to FIG. 1. The present embodiment shows a verification terminal and an approval terminal both mounted to an autonomous vehicle. However, a technical concept of the present disclosure is applicable to achievement of security of all distributed information terminals.

As is shown in FIG. 1, management servers FOG001, FOG002, FOG003, FOG004, and FOG005 are allocated to respective areas to be managed. Each of the management servers FOG001, FOG002, FOG003, FOG004, and FOG005 stores master data for block data stored in the autonomous vehicles in the corresponding preallocated area. The master data is full-size block data (that has a full length) storing the complete data for a data block in the block data formed in chronological order.

Each autonomous vehicle present in each area requests other adjacent autonomous vehicles to verify authenticity of the block data stored in the autonomous vehicle. The other autonomous vehicles requested to verify the authenticity are randomly selected from surrounding autonomous vehicles inherently randomly replaced one after another, thus allowing randomness to be excellently ensured.

Each of the autonomous vehicles stores partial block data. The partial block data is the latest data that is a part of the block data formed in chronological order. The autonomous vehicle holds only the partial block data, thus reducing calculation load. The achievement of the above-described randomness allows data falsification to be prevented. However, this configuration is not expected to offer falsification resistance based on the length of a chain, which is characteristic of the block data. In particular, an end of the partial block data may be falsified, and thus, the authenticity of the partial block data is preferably verified at a timing such as start or stoppage of an engine.

The autonomous vehicle determines that the partial block data stored in the autonomous vehicle is valid when approval of the updated partial block data is obtained from a majority of the other adjacent autonomous vehicles, and otherwise determines that the partial block data is invalid. Each autonomous vehicle inquires of the management server for the authenticity when the authenticity fails to be confirmed in an approval process executed through inter-vehicle communication with the surrounding autonomous vehicles. This reduces loads on the management server.

Figure 2:
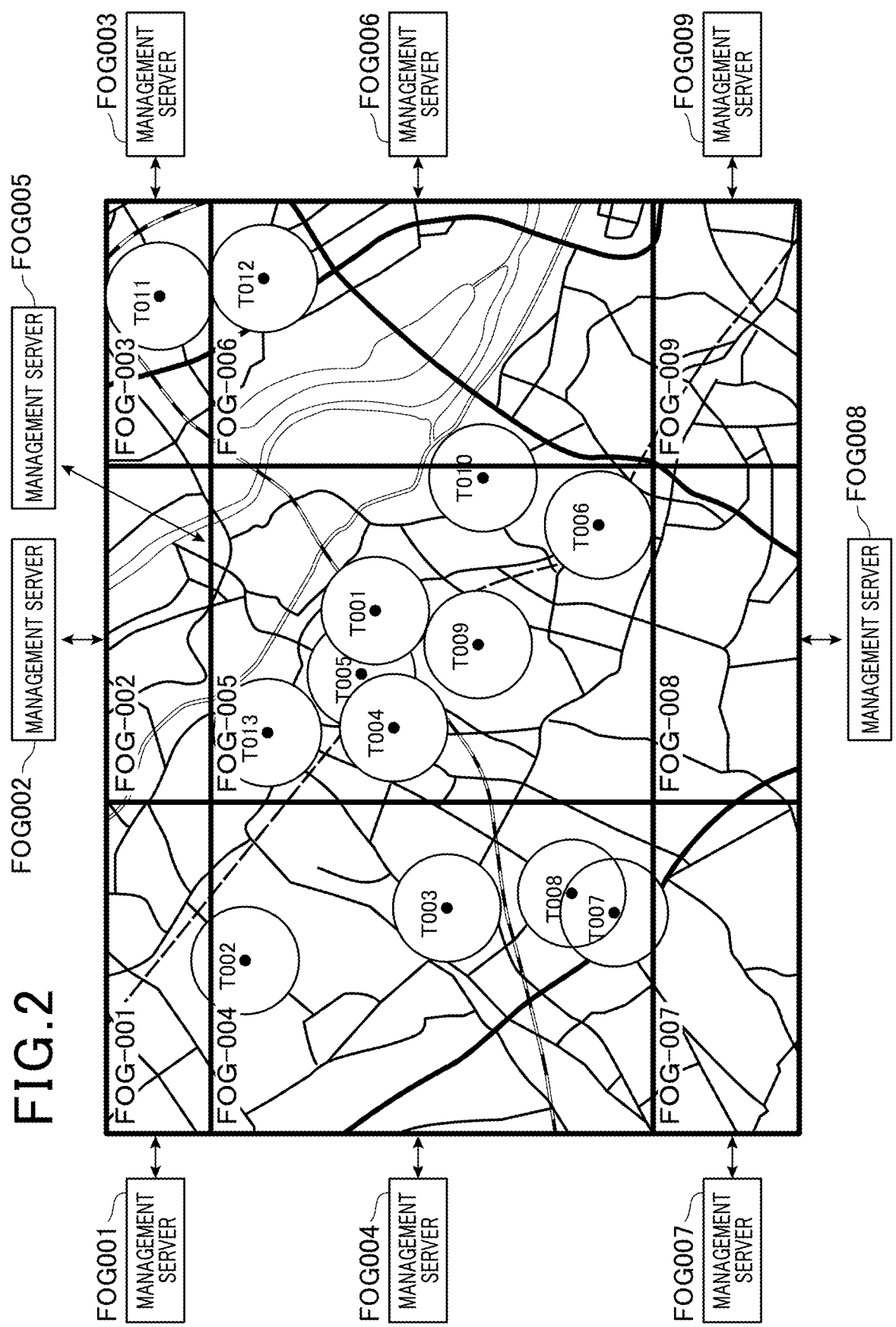
FIG. 2 is a diagram illustrating a relationship between the plurality of autonomous vehicles and the plurality of areas to which the plurality of servers are allocated, according to the embodiment.

As shown in FIG. 2, each of the management servers FOG001, FOG002, FOG003, FOG004, FOG005, FOG006, FOG007, FOG008, and FOG009 is conceptually set to be allocated to a plurality of areas so as not to overlap with one another (i.e., areas FOG-001, FOG-002, FOG-003, FOG-004, FOG-005, FOG-006, FOG-007, FOG-008, and FOG-009 in FIG. 2).

In FIG. 2, an autonomous vehicle T011 is present in the area FOG-003 to which the management server FOG003 is allocated. Autonomous vehicles T002, T003, T007, and T008 are present in the area FOG-004 to which the management server FOG004 is allocated. Autonomous vehicles T001, T004, T005, T006, T009, T010, and T013 are present in the area FOG-005 to which the management server FOG005 is allocated. An autonomous vehicle T012 is present in the area FOG-006 to which the management server FOG006 is allocated.

FIG. 3 is a correspondence table conceptually illustrating information about the autonomous vehicles stored in the management servers FOG001, FOG002, FOG003, FOG004, FOG005, FOG006, FOG007, FOG008, and FOG09 in a state shown in FIG. 2.

The management server FOG001 is mainly responsible for the preallocated area FOG-001, and also deals with object areas (to be stored) configured by the areas FOG-002, FOG-004, and FOG-005, all of which are adjacent to the area FOG-001. The management server FOG001 therefore stores master data about object terminals (to be stored) configured by the autonomous vehicles T002. T003, T007, and T008 present in the area FOG-004, and master data about the object terminals configured by the autonomous vehicles T001, T004, T005, T006, T009, and T013 present in the area FOG-005.

The management server FOG002 is mainly allocated to the area FOG-002, and also deals with object areas configured by the areas FOG-001, FOG-003, FOG-004, FOG-005, and FOG-006, all of which are adjacent to the area FOG-002. The management server FOG002 therefore stores master data about the object terminals configured by the autonomous vehicle T011 present in the area FOG-003, master data about the object terminals configured by the autonomous vehicles T002, T003, T007, and T008 present in the area FOG-004, master data about the object terminals configured by the autonomous vehicles T001. T004, T005, T006, T009, and T013 present in the area FOG-005, and master data about the object terminals configured by the autonomous vehicle T012 present in the area FOG-006.

The management server FOG003 is mainly allocated to area FOG-003, and also deals with the object areas configured by the areas FOG-002, FOG-005, and FOG-006, all of which are adjacent to FOG-003. The management server FOG003 therefore stores master data about the object terminals configured by the autonomous vehicle T011 present in the area FOG-003, master data about the object terminals configured by the autonomous vehicles T001, T004, T005, T006, T009, and T013 present in the area FOG-005, and master data about the object terminals configured by the autonomous vehicle T012 present in the area FOG-006.

The management server FOG004 is mainly allocated to the area FOG-004, and also deals with the object areas configured by the areas FOG-001, FOG-002, FOG-005, FOG-007, and FOG-008, all of which are adjacent to the area FOG-004. The management server FOG004 therefore stores master data about the object terminals configured by the autonomous vehicles T002, T003, T007, and T008 present in the area FOG-004 and master data about the object terminals configured by the autonomous vehicles T001, T004. T05, T006, T009, and T013 present in the area FOG-005.

The management server FOG005 is mainly allocated to the area FOG-005, and also deals with the object areas configured by the areas FOG-001, FOG-002, FOG-003, FOG-004, FOG-006, FOG-007, FOG-008, and FOG-009, all of which are adjacent to the area FOG-005. The management server FOG005 therefore stores master data about the object terminals configured by the autonomous vehicle T011 present in the area FOG-003, master data about the object terminals configured by the autonomous vehicles T002, T003, T007, and T008 present in the area FOG-004, master data about the object terminals configured by the autonomous vehicles T001, T004, T005, T006, T009, and T013 present in FOG-005, and master data about the object terminals configured by the autonomous vehicle T012 present in the area FOG-006.

The management server FOG006 is mainly allocated to the area FOG-006, and also deals with the object areas configured by the areas FOG-002, FOG-003, FOG-005, FOG-006, FOG-008, and FOG-009, all of which are adjacent to the area FOG-006. The management server FOG006 therefore stores master data about the object terminals configured by the autonomous vehicle T011 present in the area FOG-003, master data about the object terminals configured by the autonomous vehicles T001, T004, T005, T006, T009, and T013 present in the area FOG-005, and master data about the object terminals configured by the autonomous vehicle T012 present in the area FOG-006.

The management server FOG007 is mainly allocated to the area FOG-007, and also deals with the object areas configured by the areas FOG-004, FOG-005, and FOG-008, all of which are adjacent to the area FOG-007. The management server FOG007 stores master data about the object terminals configured by the autonomous vehicles T001, T004, T005, T006, T009, and T013 present in the area FOG-005.

The management server FOG008 is mainly allocated to the area FOG-008, and also deals with the object areas configured by the areas FOG-004, FOG-005, FOG-006, and FOG-007, all of which are adjacent to the area FOG-008. The management server FOG008 therefore stores master data about the object terminals configured by the autonomous vehicles T002, T003, T007, and T008 present in the area FOG-004, master data about the autonomous vehicles T001, T004, T005, T006, T009, and T013 present in the area FOG-005, and master data about the object terminals configured by the autonomous vehicle T012 present in the area FOG-006.

The management server FOG009 is mainly allocated to the area FOG-009, and also deals with the object areas configured by the areas FOG-005, FOG-006, and FOG-008, all of which are adjacent to the area FOG-009. The management server FOG009 therefore stores master data about the object terminals configured by the autonomous vehicles T001, T004, T005, T006. T009, and T013 present in the area FOG-005 and master data about the object terminals configured by the autonomous vehicle T012 present in the area FOG-006.

As shown in FIG. 2, when the autonomous vehicle T010 moves from the area FOG-005 to the area FOG-006, information held by the associated management server is updated. Information about the area FOG-005 is held by the management servers FOG001, FOG002, FOG003, FOG004, FOG005, FOG006, FOG007, FOG008, and FOG009. The autonomous vehicle T010 leaves the area FOG-005, and thus, information about the autonomous vehicle T010 is deleted from the information about the area FOG-005 held by the management servers FOG001, FOG002, FOG003, FOG004, FOG005, FOG006, FOG007, FOG008, and FOG009.

Information about the area FOG-006 is held by the management servers FOG002, FOG003, FOG005, FOG006, FOG007, FOG008, and FOG009. The autonomous vehicle T010 enters the area FOG-006, and thus, the information about the autonomous vehicle T010 is written to the information about the area FOG-006 held by the management servers FOG002, FOG003, FOG005, FOG006, FOG007, FOG008, and FOG009.

FIG. 4 shows an information holding state resulting from the above-described update. As shown in FIG. 4, the master data about the autonomous vehicle T010 is held in association with the area FOG-006. With regard to the management server FOG006, the master data about the autonomous vehicle T010 is continuously held by the management server FOG006 before and after the autonomous vehicle T010 moves from the area FOG-005 to the area FOG-006. In this manner, each management server shares information with the management servers responsible for the adjacent areas and hands over the information to one of the management servers responsible for the adjacent areas in response to movement of a moving body to be managed. This enables seamless management.

FIG. 5 shows an example of master data about each autonomous vehicle that is managed as a terminal. As shown in FIG. 5, the master data includes vehicle history information, payment history information, driver information, map information, development history information, and approval history information. The vehicle history information includes an accident history, a failure history, and a charge and discharge history. The payment history information includes information about expressway tolls and purchase of articles. The driver information includes information indicating whether the motor vehicle is a shared car and information about whether insurance policies have been purchased. The approval history information includes information such as timestamps and hash values.

Functional configurations of a verification terminal and an approval terminal (that act as an approver) both mounted to the autonomous vehicle will be described with reference to FIG. 6.

Figure 6:
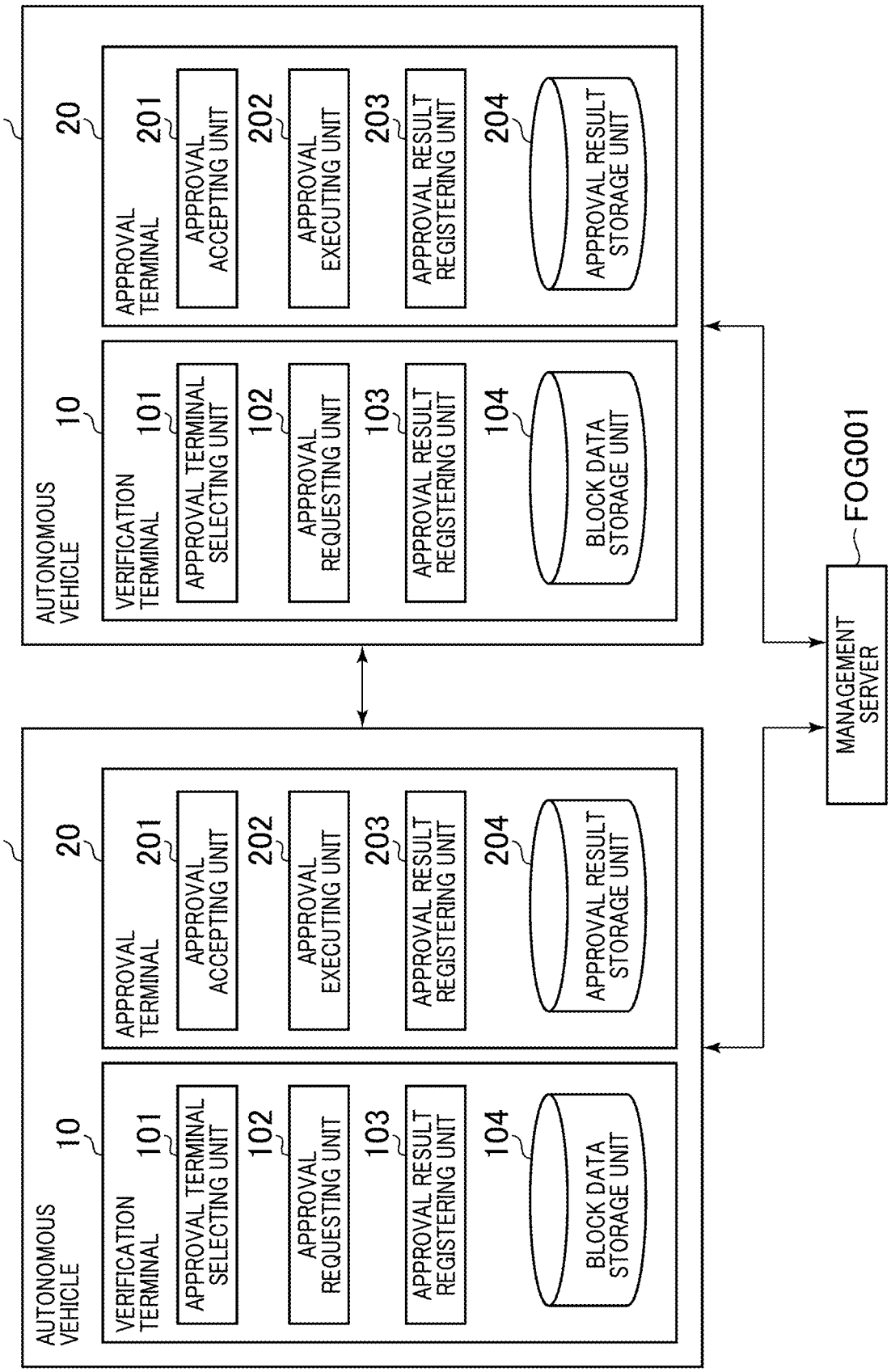
FIG. 6 is a block diagram of a functional configuration of a verification terminal and an approval terminal mounted to the autonomous vehicle, according to the embodiment.

As shown in FIG. 6, a verification terminal 10 and an approval terminal 20 are mounted to the autonomous vehicle T001. A verification terminal 10 and an approval terminal 20 are also mounted to the autonomous vehicle T002. The verification terminals 10 and the approval terminals 20 are configured to communicate with the management server FOG001. The verification terminals 10 and the approval terminals 20 are configured to communicate not only with the management server FOG001 but also with other management servers.

The verification terminal 10 includes a computer (processor) (not shown) that includes, as hardware components, a calculation unit such as a central processing unit (CPU), a storage unit such as a random access memory (RAM) or a read only memory (ROM), and an interface unit for transmitting and receiving data. The verification terminal 10 also includes a commutation unit (not shown) that transmits and receives information to and from similar verification terminals and similar approval terminals mounted to other autonomous vehicles via a wireless communication network such as a wireless local area network (LAN) (e.g., Wi-Fi network). The commutation unit of the verification terminal 10 also transmits and receives information to and from the management server allocated to the area in which the verification terminal 10 is present.

The approval terminal 20 includes a computer (processor) (not shown) that includes, as hardware components, a calculation unit such as a CPU, a storage unit such as a RAM or a ROM, and an interface unit for transmitting and receiving data. The approval terminal 20 also includes a commutation unit (not shown) that transmits and receives information to and from similar verification terminals and similar approval terminals mounted to other autonomous vehicles via a wireless communication network such as a wireless LAN (e.g., Wi-Fi network). The commutation unit of the approval terminal 20 also transmits and receives information to and from the management server allocated to the area in which the approval terminal 20 is present.

Functional components of the verification terminal 10 and the approval terminal 20 will now be described.

Figure 12:
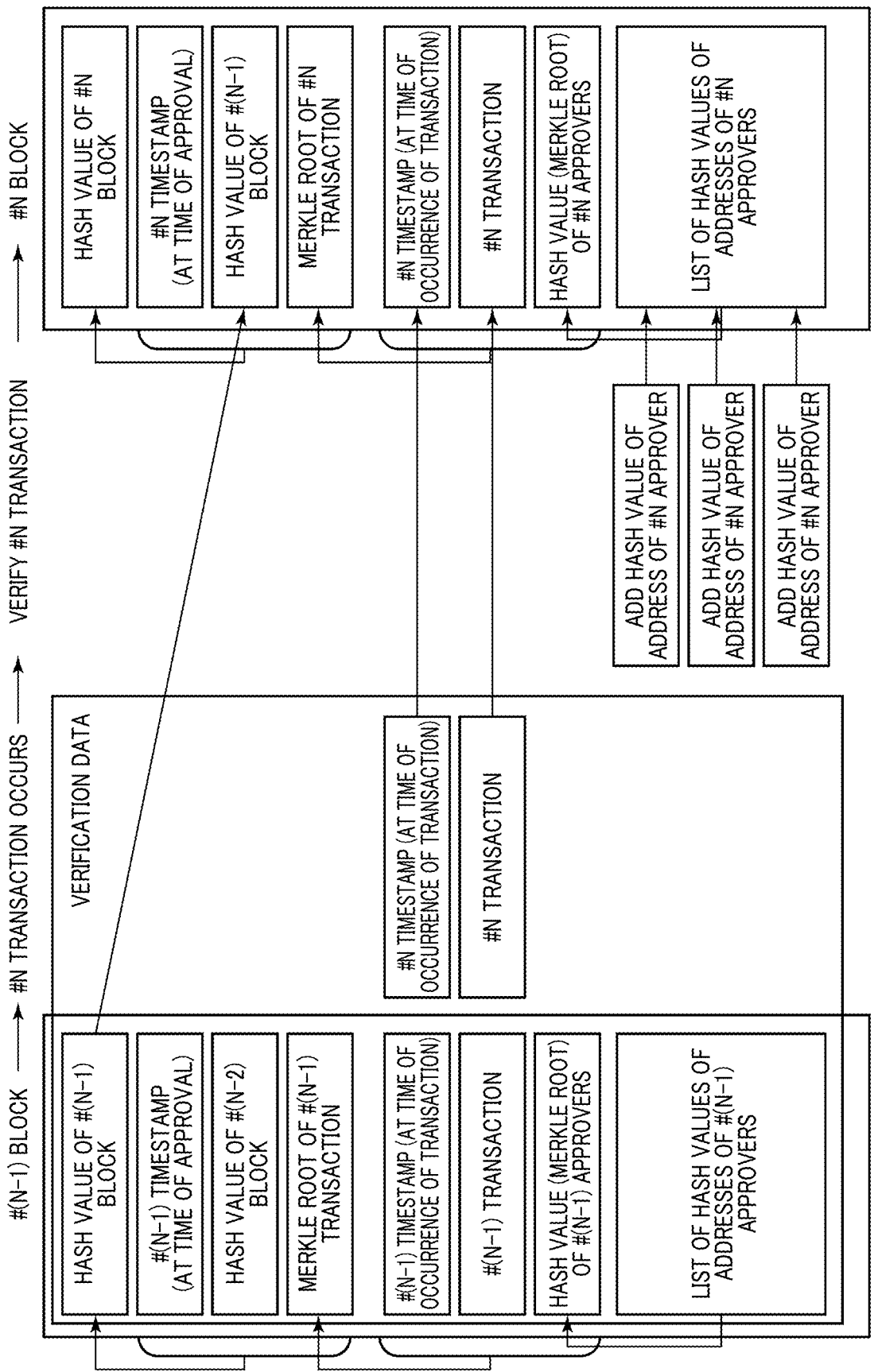
FIG. 12 is a block diagram illustrating an update process for block data performed by the verification terminal, according to the embodiment.

The verification terminal 10 includes an approval terminal selecting unit 101, an approval requesting unit 102, an approval result registering unit 103, and a block data storage unit 104. The block data storage unit 104 corresponds to a storage unit according to the disclosure that stores partial block data. The partial block data is the latest data that is a part of block data for update and addition in chronological order. FIG. 12 shows an example of partial block data stored in the block data storage unit 104.

As shown in FIG. 12, partial block data represented as "#(N−1) block" (N is an integer greater than 2) is the partial block data before updating (previous partial block data), and precedes #N block that is the updated partial block (present partial block data). The partial block data of "#(N−1) block" includes the following information:

(a1) a hash value of the #(N−1) block;

(a2) a timestamp [#(N−1) timestamp] at the time of approval of the #(N−1) block;

(a3) a hash value of a #(N−2) block [the #(N−2) block precedes the #(N−1) block];

(a4) a Merkle root of a transaction [#(N−1) transaction] of the #(N−1) block;

(a5) a timestamp [#(N−1) timestamp] at the time of occurrence of the transaction [#(N−1) transaction] of the #(N−1) block;

(a6) the transaction [#(N−1) transaction] of the #(N−1) block;

(a7) a hash value (Merkle root) of approvers (approval terminals) [#(N−1) approvers] of the #(N−1) block; and (a8) Hash values of addresses of the approvers [#(N−1) approvers] of the #(N−1) block.

Here, the transaction includes transaction data (e.g., vehicle history information, payment history information, driver information, map information, and development history information) configuring the master data (corresponding to full-size block data) shown in FIG. 5.

With reference back to FIG. 6, the verification terminal 10 will be described. The approval terminal selecting unit 101 selects a plurality of approval terminals to be requested to approve the partial block data stored in the block data storage unit 104.

When the transaction included in the partial block data stored in the block data storage unit 104 is updated, the approval requesting unit 102 requests the selected approval terminals to approve the updated partial block data to which the updated transaction and a hash value of the partial block data before updating are added.

The following description is based on an example shown in FIG. 12. The approval requesting unit 102 transmits an approval request (information) that requests approval terminals 20 to approve the updated partial block data of #N block and that includes the following information (verification data):

(b1) the partial block data of the #(N−1) block [including the above information (a1) to (a8)]:

(b2) a timestamp at the time of occurrence of a transaction (#N transaction) of a #N block; and (b3) the transaction (#N transaction) of the #N block.

With reference back to FIG. 6, the verification terminal 10 will be continuously described. The approval result registering unit 103 executes an update process of the partial block data based on approval results returned from the approval terminals 20 in response to the approval request from the approval requesting unit 102.

The following description is based on an example shown in FIG. 12. When approval of the updated partial block data is obtained from a majority of the approval terminals 20 mounted to the other autonomous vehicles, the approval result registering unit 103 generates partial block data of the

N block including the following information and stores the generated partial block data of the #N block in the block data storage unit 104:

(c1) a hash value of the #N block;

(c2) a timestamp (#N timestamp) at the time of approval of the #N block;

(c3) a hash value of the #(N−1) block [the #(N−1) block precedes the #N block];

(c4) a Merkle root of the transaction (#N transaction) of the #N block;

(c5) a timestamp (#N timestamp) at the time of occurrence of the transaction (#N transaction) of the #N block; and (c6) the transaction (#N transaction) of the #N block;

(c7) a hash value (Merkle root) of approvers (approval terminals) (#N approvers) of the #N block; and (c8) Hash values of addresses of approvers (#N approvers) of the #N block.

Here, in the example of FIG. 12, the hash value of the #N block is calculated from the timestamp obtained at the time of approval of the #N block, the hash value of the #(N−1) block, and the Merkle root of the #N transaction, using a predetermined hash function, e.g., SHA (secure hash algorithm)-256. The Merkle root of the #N transaction is calculated from the timestamp at the time of occurrence of the #N transaction, the #N transaction, and the hash value (Merkle root) of the #N approvers, using the predetermined hash function. The hash value (Merkle root) of the #N approvers is calculated from the hash values of addresses of the #N approvers, using the predetermined hash function.

As described above, the verification terminal 10 of the present embodiment is a verification terminal validating block data for update and addition in chronological order. The verification terminal 10 includes the block data storage unit 104 used as a storage unit to store partial block data. The partial block data is the latest data that is a part of full-size block data for update and addition in chronological order. The approval terminal selecting unit 101 selects a plurality of the approval terminals 20 that are requested to approve the partial block data stored in the storage unit.

When a transaction included in the partial block data stored in the block data storage unit 104 is updated by the verification terminal 10, the approval requesting unit 102 transmits the approval request that requests the selected approval terminals 20 to approve the updated partial block data to which the updated transaction and a hash value of the partial block data before updating are added. The approval result registering unit 103 executes an update process of the partial block data based on approval results returned from the approval terminals in response to the approval request from the approval requesting unit 102.

In the present embodiment, the partial block data stored in the block data storage unit 104 is the latest data that is a part of block data formed in chronological order. This reduces the amount of data stored compared to storage of full-size block data in chronological order, thus reducing calculation load in the verification terminal. The randomly selected approval terminals 20 approve the partial block data. This makes it possible to predict the approval terminals in advance, thereby being able to prevent the stored partial block data from being falsified.

In the present embodiment, the approval terminal selecting unit 101 selects the approval terminals 20 from a plurality of terminals present in the neighborhood of the verification terminal 10.

When the verification terminal 10 is movable, terminals present in the neighborhood of the verification terminal 10 are replaced one after another, and thus, the approval terminals 20 are selected from the terminals replaced one after another. This allows randomness of the approval terminals 20 to be achieved.

In the present embodiment, when approval of the updated partial block data is obtained from a majority of the approval terminals 20, the approval result registering unit 103 updates and adds new partial block data including the updated transaction.

The new partial block data is updated and added when approval of the updated partial block data is obtained from a majority of the approval terminals 20. This allows achievement of randomness of the approval terminals 20 resulting from movement of the verification terminal 10 and of robustness of the approval process.

In the present embodiment, the approval result registering unit 103 notifies the management server FOG001 of occurrence of an abnormality when approval fails to be obtained from a majority of the approval terminals 20. When approval fails to be obtained from a majority of the approval terminals 20, the management server FOG001 is notified.

This enables a reduction in communication frequency between the verification terminal 10 and the management server FOG001.

In the present embodiment, the approval result registering unit 103 inquires, at a predetermined timing, of the management server FOG001 for the authenticity of end data of the partial block data stored in the block data storage unit 104.

The partial block data stored in the block data storage unit 104 of the verification terminal 10 has only a partial length (i.e., partial data) and is the latest data that is a part of block data formed in chronological order. Thus, compared to full-size block data, the partial block data has low resistance to falsification. Consequently, the verification terminal 10 inquires, at a predetermined timing, of the management server FOG001 for the authenticity of the end data, enabling both a reduction in communication frequency and securing of authenticity of the partial block data. The predetermined timing may be selected from various timings including a timing to start or stop the engine of the autonomous vehicle T001.

The present embodiment may be considered to be a verification system including the verification terminal 10, the approval terminal 20, and the management server FOG01.

In the present embodiment, as shown in FIG. 3, the management server FOG001 includes, as hardware components, a computer (processor) that includes a CPU 31, a memory (e.g., ROM and RAM) 32, a storage unit 33, and a communication unit 34. The CPU 31 performs a predetermined verification program, which is shown in a flowchart of FIG. 13, stored in the memory 32. The storage unit 33 stores master data (see FIG. 5) that corresponds to full-size block data in chronological order. The communication unit 34 is controlled by the CPU 31 to communicate with: (i) the verification terminals and the approval terminals mounted to the autonomous vehicle; and (ii) other management servers via a communication network.

The verification system validates block data for update and addition in chronological order. In the verification system, the management server FOG001 stores, in the storage unit 33, full-size block data in chronological order in association with the verification terminal 10 that stores partial block data. The partial block data is the latest data that is a part of the full-size block data.

Figure 13:
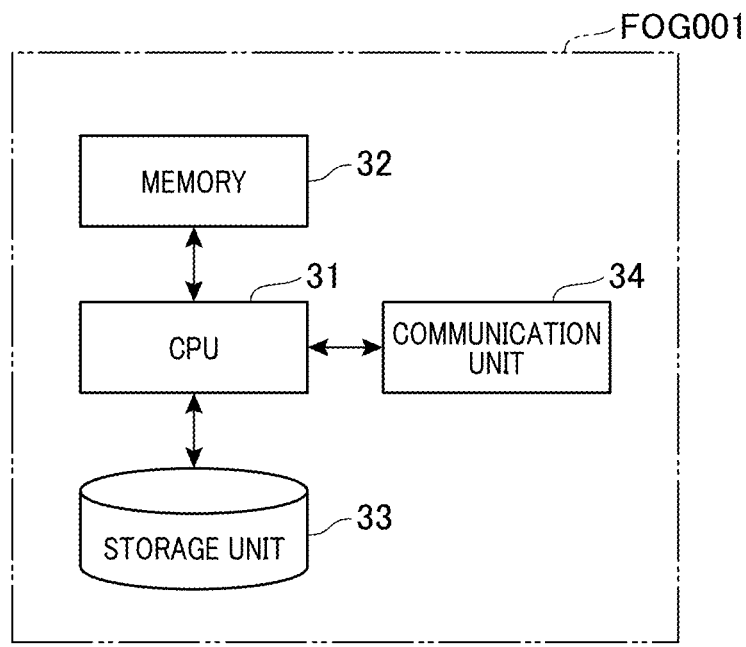
FIG. 13 is a block diagram of the management server, according to the embodiment.
Figure 14:
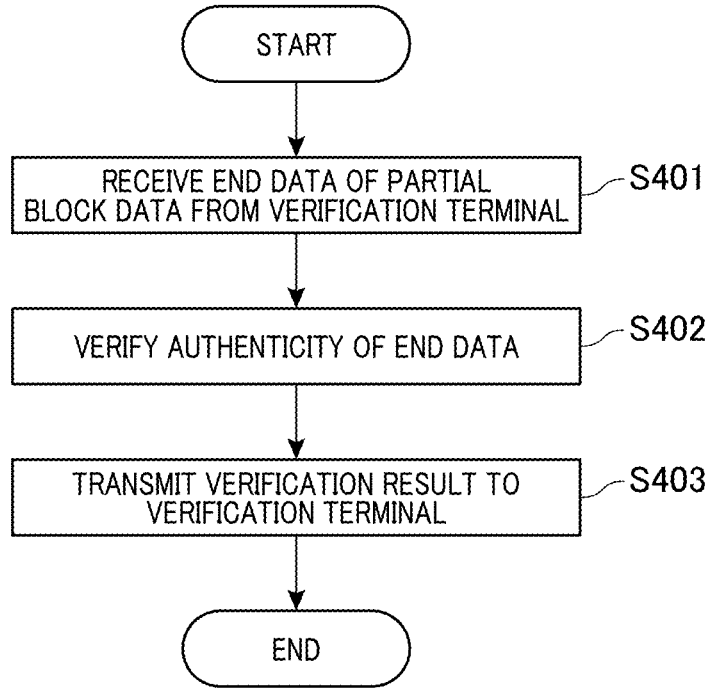
FIG. 14 is a flowchart of a verification process performed by the management server, according to the embodiment.

As shown the flowchart of FIG. 13, the management server FOG001 receives end data of the partial block data transmitted from the verification terminal 10 (step S401), and collates the received end data with the stored full-size block data to verify authenticity of the end data (step S402). The management server FOG001 transmits the verification result to the verification terminal 10 (step S403).

The partial block data stored in the block data storage unit 104 of the verification terminal 10 has only a partial length (i.e., partial data) and is the latest data that is a part of block data formed in chronological order. Thus, compared to full-size block data, the partial block data has low resistance to falsification. Consequently, the verification terminal 10 inquires of the management server FOG001 for the authenticity of the end data, enabling securing of authenticity of the partial block data.

As described with reference to FIGS. 1 to 5, the management servers FOG001, FOG002, FOG003, FOG004, FOG005, FOG006, FOG007, FOG008, and FOG009 are provided in the respective areas and each verify the authenticity of the end data stored in each of the verification terminals 10 present in the area to which the management server is allocated.

The management servers FOG001, FOG002, FOG003, FOG004, FOG005, FOG006, FOG007, FOG008, and FOG009 are provided in the respective areas, enabling a reduction in calculation loads in the individual management servers FOG01, FOG002, FOG003, FOG004. FOG005, FOG006, FOG007, FOG008, and FOG009.

When any of the verification terminals 10 moves to a different area, the full-size block data is transferred to one of the management servers FOG001, FOG002, FOG003, FOG004. FOG005, FOG006, FOG007, FOG008, and FOG009 that is allocated to the area to which the verification terminal 10 has moved.

The full-size block data stored in the management server FOG01, FOG002, FOG003, FOG004, FOG005, FOG006, FOG007, FOG008, or FOG009 is transferred in response to movement of the verification terminal 10, thus enabling verification responsive to movement of the verification terminal 10.

The approval terminal 20 of the present embodiment includes, as functional components, an approval accepting unit 201, an approval executing unit 202, an approval result registering unit 203, and an approval result storing unit 204.

The approval accepting unit 201 is a unit accepting an approval request from the approval requesting unit 102 mounted to another autonomous vehicle. The approval executing unit 202 is a unit verifying, based on the approval request, the authenticity of the partial block data stored in the block data storage unit 104 mounted to another autonomous vehicle. The approval result registering unit 203 is a unit registering, in the approval result storing unit 204, an approval result from the approval executing unit 202 and transmitting the approval result to the management server FOG001.

Next, operation of the verification terminal 10 and the approval terminal 20 will be described with reference to FIGS. 7 to 11. FIGS. 7 to 10 show a flowchart of a verification process performed by the verification terminal 10, and FIG. 11 shows a flowchart of an approval process performed by the approval terminal 20. The verification process is performed by the functional components of the verification terminal 10 in which the CPU executes a predetermined program (verification program) stored in the storage unit. The approval process is performed by the functional components of the approval terminal 20 in which the CPU executes a predetermined program (approval program) stored in the storage unit.

Figure 7:
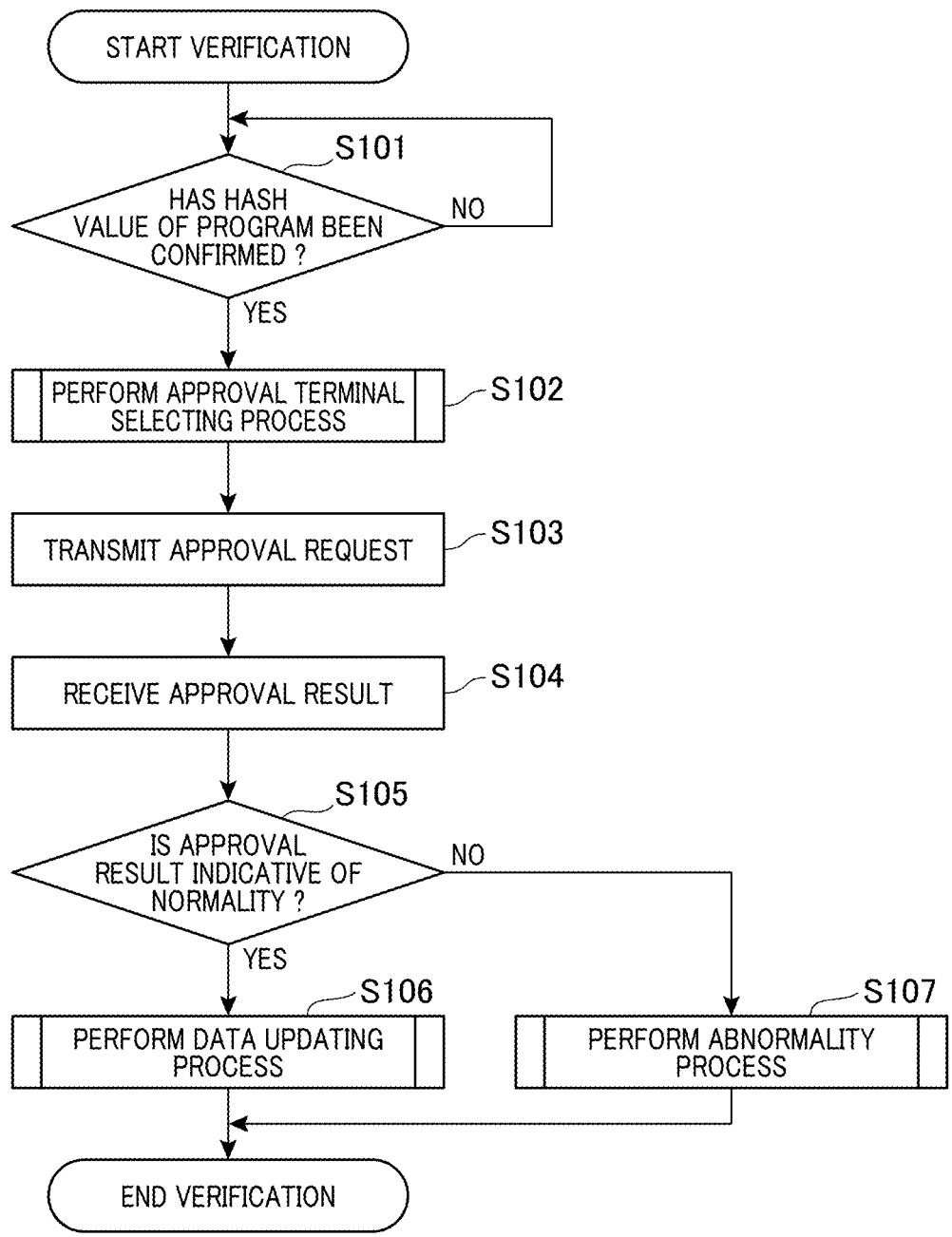
FIG. 7 is a flowchart of a verification process performed by the verification terminal, according to the embodiment.

At step S101 of FIG. 7, the verification terminal 10 checks whether a hash value of the program used in the verification process has been confirmed. This step S101 is to confirm validity of the program. The hash value of the program is calculated from the program, using the predetermined hash function. When the calculated hash value is the same as a predetermined hash value stored in the verification terminal 10, the hash value of the program is confirmed. When the calculated hash value is the same as the predetermined hash value, the hash value of the program is unconfirmed. When the hash value of the program has been confirmed (i.e., a YES determination is made at step S101), the process proceeds to step S102. When the hash value of the program has been unconfirmed (i.e., a NO determination is made at step S101), step S101 is repeatedly performed.

At step S102, in the verification terminal 10, the approval terminal selecting unit 101 executes an approval terminal selecting process. The approval terminal selecting process will be described with reference to FIG. 8.

Figure 8:
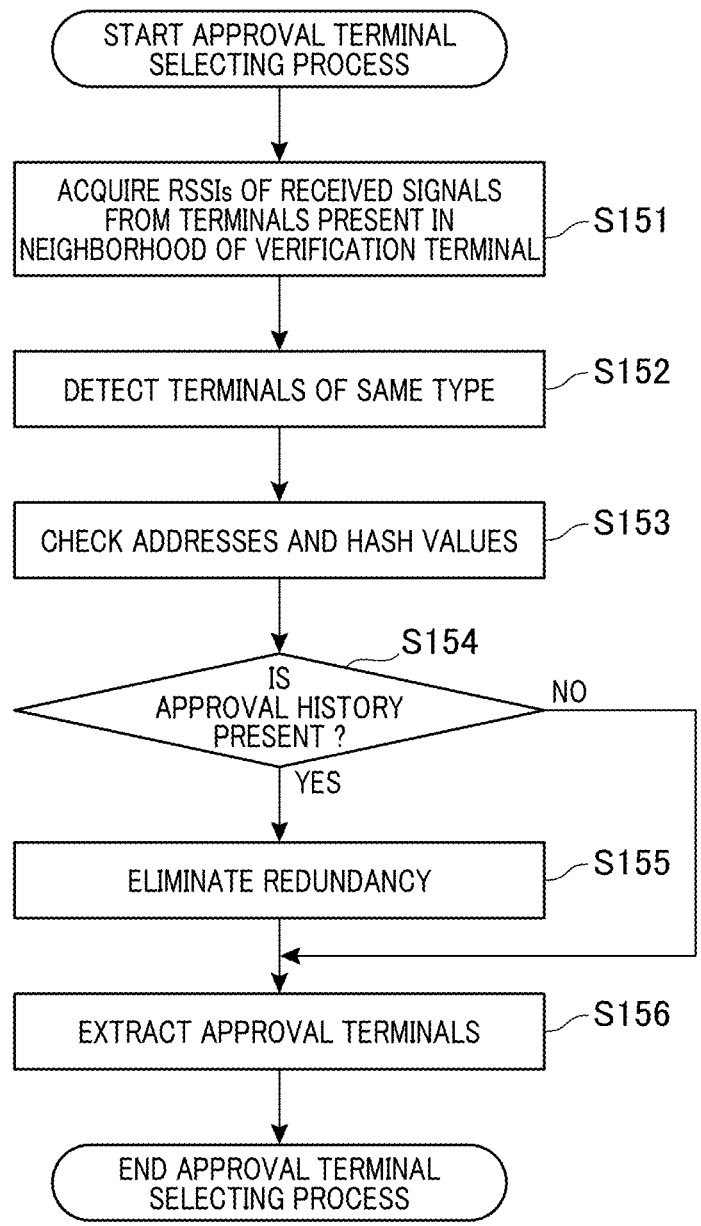
FIG. 8 is a flowchart of an approval terminal selecting process in the verification process performed by the verification terminal, according to the embodiment.

At step S151 of FIG. 8, the approval terminal selecting unit 101 acquires received signal strength indicators (RSSI) of surrounding autonomous vehicles and information terminals from information received by the verification terminal 10. The RSSI is indicative of a received signal strength in a Wi-Fi network in the present embodiment. Thus, the autonomous vehicles or information terminals with larger RSSIs may be selected and identified as neighboring terminals of the verification terminal 10. GPS information may also be used to identify neighboring terminals.

At step S152 following step S151, the approval terminal selecting unit 101 selects terminals of the same type based on information received by the verification terminal 10. The selected terminals of the same type are approval terminals mounted to autonomous vehicles of the same type or mounted to autonomous vehicles in pairs with verification terminals of the same type.

At step S153 following step S152, the approval terminal selecting unit 101 acquires and checks addresses and hash values of the selected terminals from information received by the verification terminal 10. At step S154 following step S153, the approval terminal selecting unit 101 checks approval histories of the selected terminals based on information received by the verification terminal 10. When any approval history is present (i.e., a YES determination is made at step S154), the process proceeds to step S155. When no approval history is present (i.e., a NO determination is made at step S154), the process proceeds to step S156.

At step S155, the approval terminal selecting unit 101 executes a process of eliminating terminals previously (redundantly) selected as approval terminals. This is because selecting the same terminals as approval terminals many times is more open to illegal falsification.

At step S156 following step S154 and step S155, the approval terminal selecting unit 101 extracts the approval terminals 20. When step S156 ends, the approval terminal selecting process is ended and the process proceeds to step S103 in FIG. 7.

At step S103, in the verification terminal 10, the approval requesting unit 102 transmits an approval request to the selected approval terminals 20. The transmitted approval request is received by the approval accepting unit 201 of each of the approval terminals 20. When the approval request is received, the approval terminal 20 executes an approval process shown in FIG. 11.

At step S301 of FIG. 11, in the approval terminal 20, the approval executing unit 202 checks for consistency of the timestamps in information (verification data) that is added to the approval request transmitted from the verification terminal 10. According to the example shown in FIG. 12, in the verification data, the timestamp [#(N−1) timestamp] at the time of occurrence of the transaction [#(N−1) transaction] of the #(N−1) block and the timestamp (#N timestamp) at the time of occurrence of the transaction (#N transaction) of the #N block are checked for consistency. When inconsistency of both the timestamps [#(N−1) timestamp and #N timestamp] such as reversal of the time sequence has not occurred (i.e., a YES determination is made at step S301), the process proceeds to step S302. When inconsistency such as reversal of the time sequence has occurred (i.e., a NO determination is made at step S301), the process proceeds to step S306.

At step S302, the approval executing unit 202 checks for consistency of the transaction in information (verification data) that is added to the approval request transmitted from the verification terminal 10. According to the example shown in FIG. 12, in the verification data, the transaction [#(N−1) transaction] of the #(N−1) block and the transaction (#N transaction) of the #N block are checked for consistency. When both the transactions [#(N−1) transaction and #N transaction] are consistent with each other (i.e., a YES determination is made at step S302), the process proceeds to step S303. When both the transactions [#(N−1) transaction and #N transaction] are inconsistent with each other (i.e., a NO determination is made at step S302), the process proceeds to step S306.

At step S303, the approval executing unit 202 checks for consistency of the Merkle root in information (verification data) that is added to the approval request transmitted from the verification terminal 10. According to the example shown in FIG. 12, in the verification data, a Merkle root of the transaction [#(N−1) transaction] of the #(N−1) block and a Merkle root of the transaction (#N transaction) of the #N block are checked for consistency. When both the Merkle roots (the Merkle root of #(N−1) transaction and the Merkle root of #N transaction) are consistent with each other (i.e., a YES determination is made at step S303), the process proceeds to step S304 When both the Merkle roots (the Merkle root of #(N−1) transaction and the Merkle root of #N transaction) are inconsistent with each other (i.e., a NO determination is made at step S303), the process proceeds to step S306.

At step S304, the approval executing unit 202 checks a hash value of the partial block data in information (verification data) that is added to the approval request transmitted from the verification terminal 10. According to the example shown in FIG. 12, the approval executing unit 202 checks whether the hash value of the #(N−1) block included in the verification data is identical to the hash value of the #(N−1) block stored in the approval result storing unit 204. When the hash value of the #(N−1) block in the verification data is identical to the stored hash value (i.e., a YES determination is made at step S304), the process proceeds to step S305. When the hash value of the #(N−1) block in the verification data is not identical to the stored hash value (i.e., a NO determination is made at step S304), the process proceeds to step S306.

At step S305, the approval executing unit 202 determines to give approval in response to the approval request and transmits the corresponding information to the verification terminal 10. At step S306, the approval executing unit 202 determines not to give approval in response to the approval request and transmits the corresponding information to the verification terminal 10 and the management server FOG001.

With reference back to FIG. 7, the process will be continuously described. At step S104, in the verification terminal 10, the approval result registering unit 103 receives an approval result from the approval executing unit 202 of the approval terminal 20. At step S105 following step S104, the approval result registering unit 103 checks whether the approval result is indicative of normality (whether the approval request has been granted). When the approval result is indicative of normality (i.e., a YES determination is made at step S105), the process proceeds to step S106. When the approval result is not indicative of normality (i.e., a NO determination is made at step S105), the process proceeds to step S107.

At step S106, the approval result registering unit 103 executes a data updating process. The data updating process will be described with reference to FIG. 9.

Figure 9:
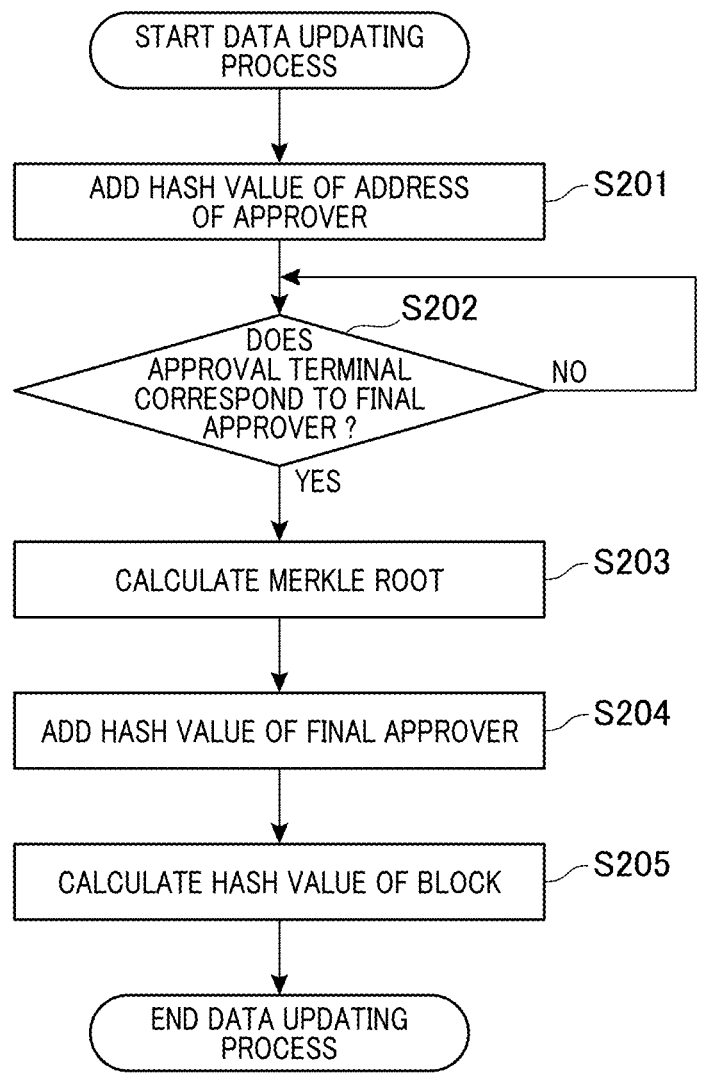
FIG. 9 is a flowchart of a data updating process in the verification process performed by the verification terminal, according to the embodiment.

At step S201 of FIG. 9, in the verification terminal 10, the approval result registering unit 103 adds the hash value of the address of the approver. At step S202 following step S201, the approval result registering unit 103 determines whether the approval terminal having transmitted the approval result corresponds to the final approver. It is determined whether the approval terminal having transmitted the approval result corresponds to the final approver depending on whether the final of the approval results has been returned from the plurality of approval terminals to which the approval request was transmitted.

When the approval terminal having transmitted the approval result corresponds to the final approver (i.e., a YES determination is made at step S202), the process proceeds to step S203. When the approval terminal having transmitted the approval result does not correspond to the final approver (i.e., a NO determination is made at step S202), step S202 is repeatedly performed.

At step S203, the approval result registering unit 103 calculates the Merkle root of the #N transaction, using the predetermined hash function. At step S204 following step S203, the approval result registering unit 103 adds the hash value of the final approver.

At step S205 following step S204, the approval result registering unit 103 calculates the hash value of the #N block, using the predetermined hash function, and stores the calculated hash value of the #N block in the block data storage unit 104. The approval result registering unit 103 also transmits the hash value to the approval terminals 20 having given approval. When step S205 ends, the verification process is ended as shown back in FIG. 1.

At step S107 of FIG. 7, in the verification terminal 10, the approval result registering unit 103 executes an abnormality process. The abnormality process will be described with reference to FIG. 10.

Figure 10:
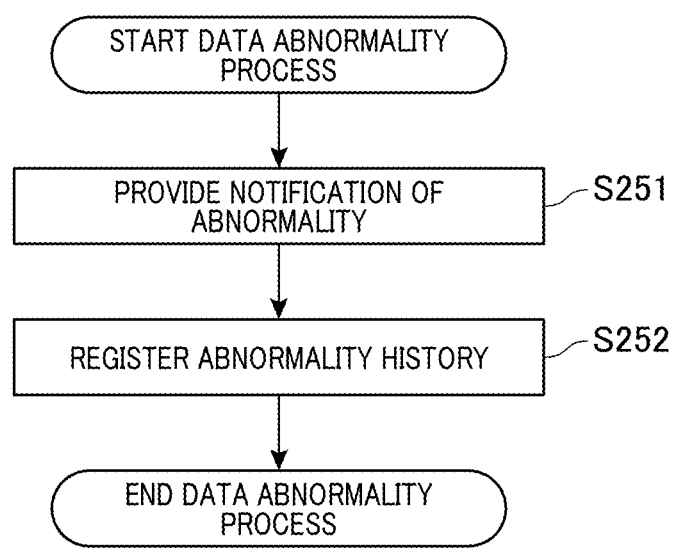
FIG. 10 is a flowchart of an abnormality process in the verification process performed by the verification terminal, according to the embodiment.
Figure 11:
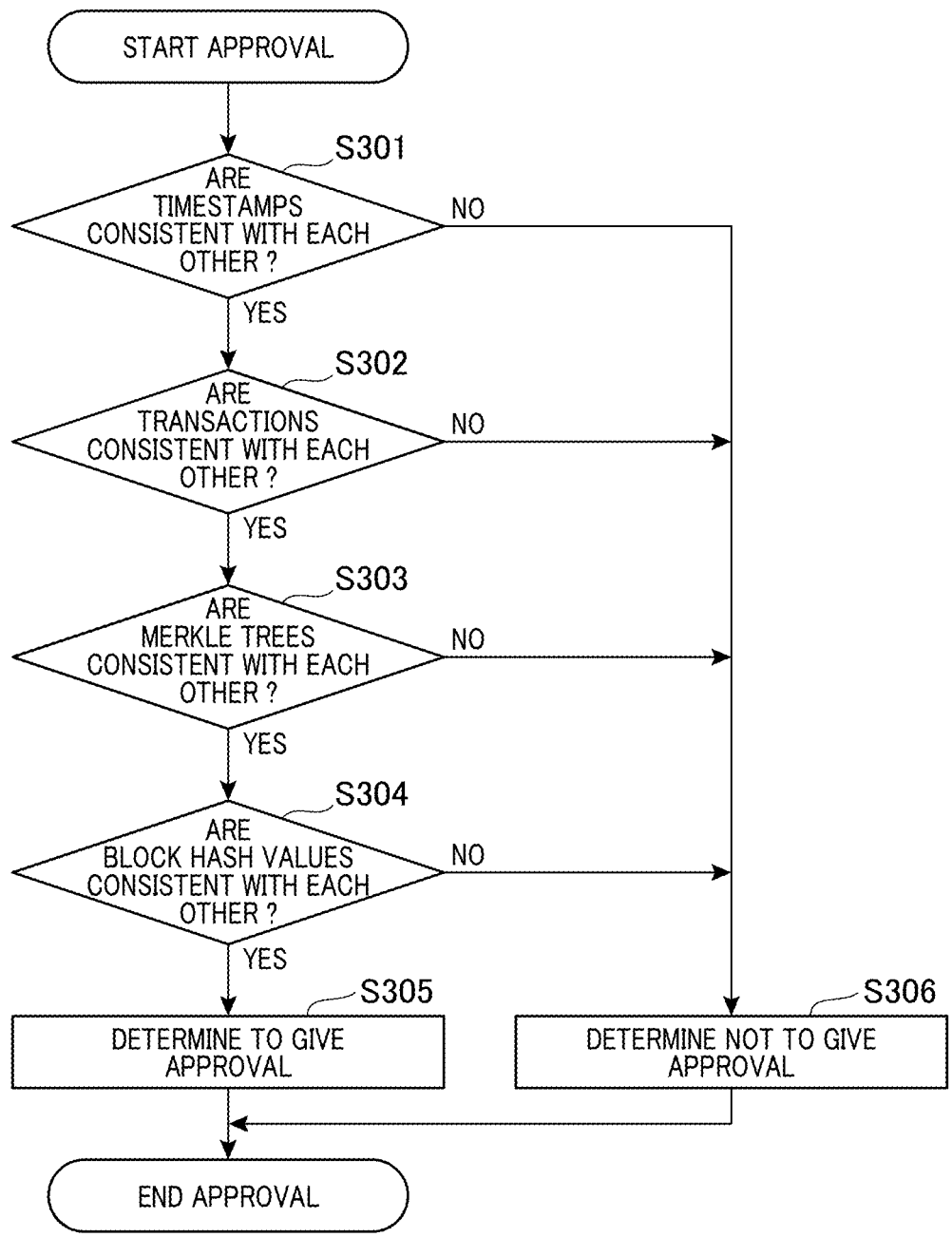
FIG. 11 is a flowchart of an approval process performed by the approval terminal that has received an approval request from the verification terminal, according to the embodiment.

At step S251 of FIG. 10, in the verification terminal 10, the approval result registering unit 103 notifies the management server FOG001 of an abnormality. At step S252 following step S251, the approval result registering unit 103 registers an abnormality history in the block data storage unit 104. When step S252 ends, the verification process is ended as seen previously in FIG. 7.

The present embodiment has been described with reference to the specific examples. However, the disclosure is not limited to the specific examples. The specific examples to which a person skilled in the art makes appropriate design changes are also included within the scope of the present disclosure. The elements included in the above-described specific examples, and the arrangements and shapes of and conditions for the elements and the like are not limited to the shown ones but may be appropriately changed. The elements included in the above-described specific examples can be appropriately recombined unless the recombination results in technical inconsistency.

What is claimed is:

1. A verification terminal that validates block data for update and addition in chronological order, the verification terminal comprising:
   a memory; and
   a processer configured to:
      store, in the memory, partial block data, the partial block data being a latest data that is a part of full-size block data for update and addition in chronological order, the partial block data including a transaction, a timestamp at a time of approval of the partial block data, and a timestamp at a time of occurrence of the transaction of the partial block data;
      select a plurality of approval terminals to approve the partial block data stored in the memory;
      transmit, when the transaction included in the partial block data stored in the memory is updated by the verification terminal, an approval request that requests the selected approval terminals to approve the updated partial block data to which the updated transaction and a hash value of the partial block data before updating are added;
      execute an update process of the partial block data based on approval results returned from the selected approval terminals in response to the approval request; and
      transmit end data of the updated partial block data transmitted from the selected approval terminals to a management server that collates the received end data with the full-size block data to verify authenticity of the end data.

2. The verification terminal according to claim 1, wherein:
   the processor is configured to select the approval terminals from a plurality of terminals present in a neighborhood of the verification terminal.

3. The verification terminal according to claim 2, wherein:
   the processor is configured to update and add new block data including a transaction to be updated when approval of the updated partial block data is obtained from a majority of the approval terminals.

4. The verification terminal according to claim 2, wherein:
   the processor is configured to notify a management server of occurrence of an abnormality when there is no approval of the updated partial block data obtained from a majority of the approval terminals.

5. The verification terminal according to claim 1, wherein the processor is configured to inquire, at a predetermined timing, of a management server for authenticity of end data of the partial block data stored in the memory.

6. A verification system that validates block data for update and addition in chronological order, the verification system comprising:
   at least one management server; and
   a verification terminal, wherein
   the at least one management server is configured to:
      store full-size block data for update and addition in chronological order in association with the verification terminal that stores partial block data, the partial block data being the latest data that is a part of the full-size block data, the partial block data including a transaction, a timestamp at a time of approval of the partial block data, and a timestamp at a time of occurrence of the transaction of the partial block data;
      receive end data of the partial block data transmitted from the verification terminal, wherein the partial block data is previously approved by selected approval terminals; and
      collate the received end data with the stored full-size block data to verify authenticity of the end data, wherein
   the verification terminal executes an update process of the partial block data based on approval results returned from the selected approval terminals.

7. The verification system according to claim 6, wherein:
   the at least one management server is a plurality of management servers that are allocated to a plurality of areas in which the verification terminal moves, and
   each of the management servers are configured to verify the authenticity of the end data stored in the verification terminal present in each of the areas to which each of the management servers are allocated.

8. The verification system according to claim 7, wherein:
   the areas include a first area and a second area;
   the management servers include
      a first management server that is allocated to the first area, and
      a second management server that is allocated to the second area; and
   when the verification terminal moves from the first area to the second area, the full-size block data is transferred from the first management server to the second management server.

9. The verification system according to claim 6, wherein:
   the verification terminal is mounted to a vehicle.

10. A verification method for validating block data for update and addition in chronological order, the verification terminal comprising:
   storing, in a memory provided in a verification terminal, partial block data, the partial block data being a latest data that is a part of full-size block data for update and addition in chronological order, the partial block data including a transaction, a timestamp at a time of approval of the partial block data, and a timestamp at a time of occurrence of a transaction of the partial block data;
   selecting, by the verification terminal, a plurality of approval terminals to approve the partial block data stored in the memory;
   transmitting, by the verification terminal, when the transaction included in the partial block data stored in the memory is updated by the verification terminal, an approval request that requests the selected approval terminals to approve the updated partial block data to which the updated transaction and a hash value of the partial block data before updating are added;
   executing, by the verification terminal, an update process of the partial block data based on approval results returned from the selected approval terminals in response to the approval request from the verification terminal; and
   transmitting end data of the updated partial block data transmitted from the selected approval terminals to a management server that collates the received end data with the full-size block data to verify authenticity of the end data.

* * * * *